(12) United States Patent
Chiu et al.

(10) Patent No.: US 11,140,319 B2
(45) Date of Patent: Oct. 5, 2021

(54) EYE-TRACKING MODULE WITH SCENARIO-BASED MODE SWITCHING FUNCTION

(71) Applicant: Ganzin Technology, Inc., Taipei (TW)

(72) Inventors: Po-Jung Chiu, Nantou County (TW); Kuei-An Li, New Taipei (TW); Kuan-Ling Liu, Kaohsiung (TW); Ming-Yi Tai, Taichung (TW); Chia-Ming Chang, Taipei (TW); Shao-Yi Chien, Taipei (TW)

(73) Assignee: Ganzin Technology, Inc., Taipei (TW)

( * ) Notice: Subject to any disclaimer, the term of this patent is extended or adjusted under 35 U.S.C. 154(b) by 0 days.

(21) Appl. No.: 16/885,293

(22) Filed: May 28, 2020

(65) Prior Publication Data

US 2020/0382717 A1 Dec. 3, 2020

Related U.S. Application Data

(60) Provisional application No. 62/853,173, filed on May 28, 2019, provisional application No. 62/957,279, filed on Jan. 5, 2020.

(51) Int. Cl.
*H04N 5/232* (2006.01)
*G06F 3/01* (2006.01)
*H04N 5/235* (2006.01)
*H04N 5/225* (2006.01)

(52) U.S. Cl.
CPC ....... *H04N 5/232411* (2018.08); *G06F 3/013* (2013.01); *H04N 5/2254* (2013.01); *H04N 5/2354* (2013.01); *H04N 5/23245* (2013.01)

(58) Field of Classification Search
CPC .... G06F 3/013; H04N 5/2254; H04N 5/2257; H04N 5/232411; H04N 5/23245; H04N 5/2354; H04N 5/332
USPC ............. 348/54, 78, 222.1; 345/156, 158, 8; 382/103, 195
See application file for complete search history.

(56) References Cited

U.S. PATENT DOCUMENTS

| 2009/0268045 | A1* | 10/2009 | Sur | H04N 9/04559 348/222.1 |
| 2013/0106681 | A1* | 5/2013 | Eskilsson | H04N 5/23241 345/156 |
| 2014/0145914 | A1* | 5/2014 | Latta | G06F 3/013 345/8 |
| 2016/0274659 | A1* | 9/2016 | Caraffi | H04N 5/232 |

(Continued)

*Primary Examiner* — Thai Q Tran
*Assistant Examiner* — Stephen R Smith
(74) *Attorney, Agent, or Firm* — Winston Hsu (57) ABSTRACT

An eye-tracking module includes a power management module, a sensing module and a processor. The power management module is configured to supply power according to a power control signal for operating the eye-tracking module in a corresponding mode, and provide a power status signal associated its power supplying status. The sensing module includes at least one image sensor configured to capture an eye image of a user at a sampling rate. The processor is configured to acquire eye characteristics of the user, the eye-movement information of the user, or vision information including user gaze coordinates according to the eye image. The processor is also configured to adjust the sampling rate, adjust its output frequency and/or switch the operational mode of the eye-tracking module according to the power status signal.

20 Claims, 4 Drawing Sheets

(56) References Cited

U.S. PATENT DOCUMENTS

2019/0158819 A1\* 5/2019 Hong ................ H04N 5/33
2019/0250704 A1\* 8/2019 Price ................ G06F 1/325

\* cited by examiner

EYE-TRACKING MODULE WITH SCENARIO-BASED MODE SWITCHING FUNCTION

CROSS REFERENCE TO RELATED APPLICATIONS

This application claims priority of U.S. provisional Application No. 62/957,279 filed on 2020 Jan. 5 and U.S. provisional Application No. 62/853,173 filed on 2019 May 28.

BACKGROUND OF THE INVENTION

1. Field of the Invention

The present invention is related to an eye-tracking module, and more particularly, to an eye-tracking module with scenario-based mode switching function.

2. Description of the Prior Art

Eye tracking is a technology for acquiring eye positions and eye movement by measuring either the point of gaze or the motion of an eye relative to the head. Eye tracking technology is widely used on psychological researches, user behavior experiments and employee orientation in commercial, industrial, educational or medical application.

Commonly used for detecting user status such as the degree of fatigue, the concentration level or the work load, a head-mounted eye-tracking device typically includes a head-mounted device (HMD) installed with at least one Infrared (IR) light source and an image sensor. The head-mounted device may be a virtual reality (VR) HMD, an augmented reality (AR) HMD, a mixed reality (MR) HMD, a smart glass, and glass-type or helmet-type equipment. Under the illumination of the IR light source, the bright spots and the user eye image captured by the image sensor can be analyzed for acquiring the gaze points of the user, which may thus be used in VR/AR/MR applications for interacting with virtual objects.

Although a head-mounted eye-tracking device is advantageous over traditional remote eye-trackers in small size, mobility and working better in real-world scenarios, its operation depends on its battery life. Therefore, there is a need for an eye-tracking module capable of switching operational modes according to scenarios and extending its battery life.

SUMMARY OF THE INVENTION

The present invention provides an eye-tracking module which includes a power management module, a sensing module and a processor. The power management module is configured to supply a power according to a power control signal for operating the eye-tracking module in a corresponding mode, and provide a power status signal associated with a power supply status of the power management module. The sensing module includes at least one image sensor configured to capture an eye image of a user at a sampling rate. The processor is configured to acquire an ocular information which includes at least one of an eye characteristic of the user, an eye movement of the user, and a gaze coordinate of the user according to the eye image; and adjust at least one of the sampling rate, an output frequency of the processor and an operational mode of the eye-tracking module according to the power status signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
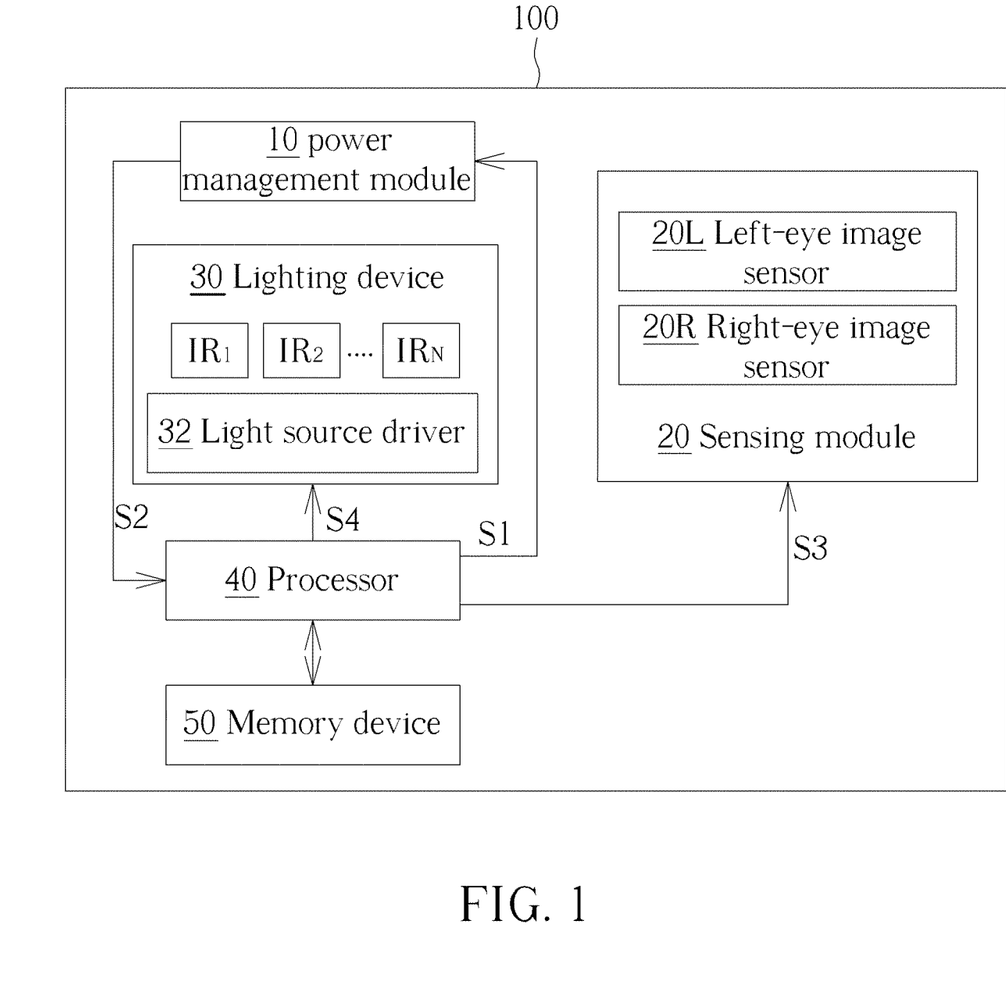
FIG. 1 is a functional diagram illustrating an eye-tracking module according to an embodiment of the present invention.
Figure 2:
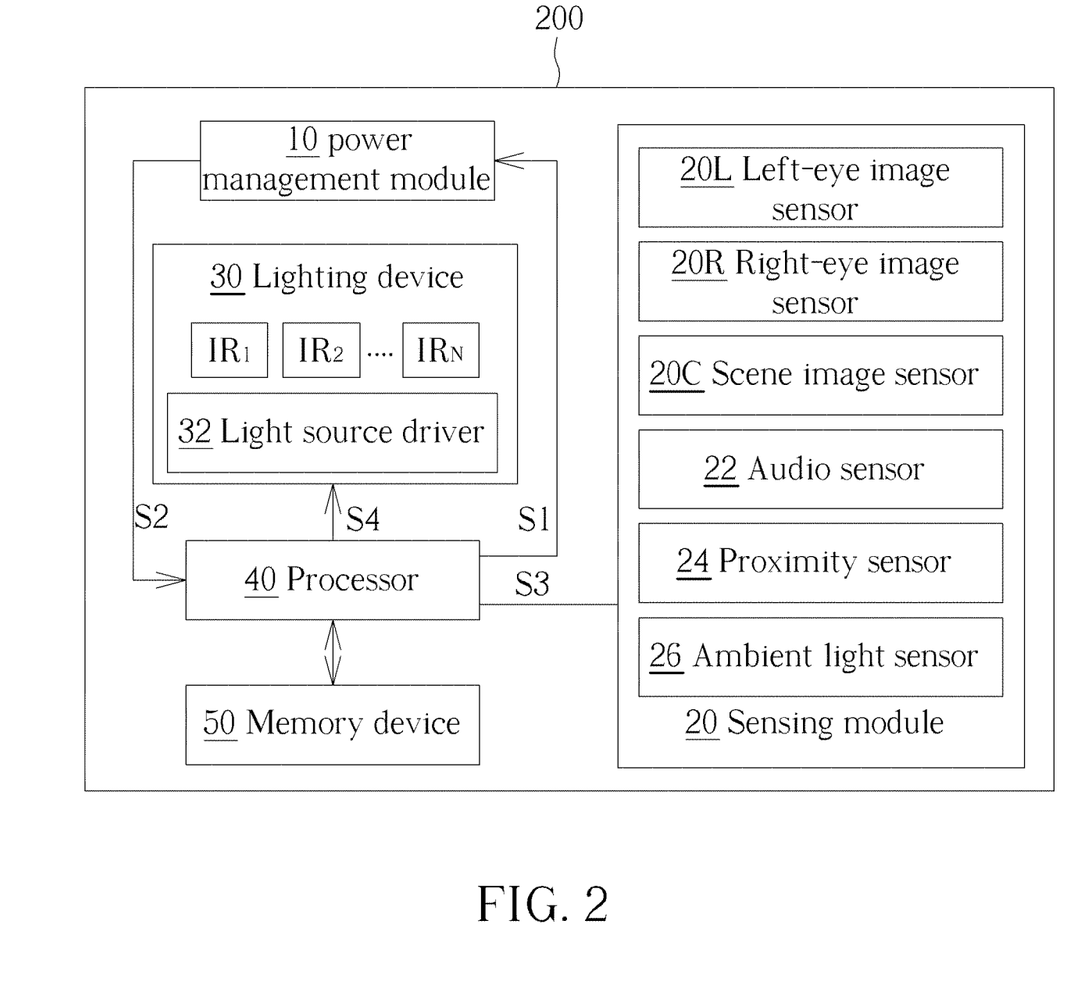
FIG. 2 is a functional diagram illustrating an eye-tracking module according to another embodiment of the present invention.

FIG. 1 is a functional diagram illustrating an eye-tracking module 100 according to an embodiment of the present invention. FIG. 2 is a functional diagram illustrating an eye-tracking module 200 according to another embodiment of the present invention. Each of the eye-tracking modules 100 and 200 includes a power management module 10, a sensing module 20, a lighting device 30, a processor 40, and a memory device 50. In the present invention, each of the eye-tracking modules 100 and 200 may be installed on a VR/AR/MR HMD, a smart glass, and any glass-type or helmet-type equipment. However, the type of HMD on which the eye-tracking module 100 or 200 is installed does not limit the scope of the present invention.

In the eye-tracking module 100 or 200 of the present invention, the power management module 10 is configured to supply stable power for operating each device in the eye-tracking module 100 or 200. In an embodiment, the power management module 10 includes a built-in power source which is configured to adjust the amount of power supplied to each device according to a power control signal S1 provided by the processor 40, so that the eye-tracking module 100 or 200 can operate in a corresponding mode. In another embodiment, when the eye-tracking module 100 or 200 is installed on an HMD which includes a built-in power source, the power management module 10 is configured to receive and modulate the power supplied by the HMD and adjust the amount of power supplied to each device according to a power control signal S1 provided by the processor 40, so that the eye-tracking module 100 or 200 can operate in a corresponding mode. The power management module 10 is also configured to provide a power status signal S2 associated with it power supply status, wherein the power status signal S2 includes information related to the amount or the stability of its output power. However, the method of powering the power management module 10 does not limit the scope of the present invention.

In the eye-tracking module 100 or 200 of the present invention, the sensing module 20 includes at least one image sensor which is configured to capture eye images of a user and adjust its sampling rate according to an image control signal S3 provided by the processor 40. In the embodiments illustrated in FIGS. 1 and 2, the sensing module 20 includes at least a left-eye image sensor 20L and a right-eye image sensor 20R configured to capture left-eye eye images and right-eye eye images of the user, respectively. However, the number of image sensors in the sensing module 20 does not limit the scope of the present invention.

In another embodiment, the sensing module 20 may further include a scene image sensor for recording images within the visual perspective of the user. In another embodiment, the sensing module 20 may further include an audio sensor for recording the occurrence of sound in the environment of the user. In another embodiment, the sensing module 20 may further include a proximity sensor for recording the occurrence of motion in the environment of the user. In another embodiment, the sensing module 20 may further include an ambient light sensor for detecting the ambient light status in the environment of the user. In the eye-tracking module 200 depicted in FIG. 2, the sensing module 20 includes a left-eye image sensor 20L, a right-eye image sensor 20R, a scene image sensor 20C, an audio sensor 22, a proximity sensor 24, and an ambient light sensor 26. However in other embodiments, in addition to at least one image sensor, the sensing module 20 may further include at least one or any combination among a scene image sensor, an audio sensor, a proximity sensor and an ambient light sensor.

In the present invention, the sensing module 20 may further include at least one filter device for adjusting the transmission characteristic of the at least one image sensor with respect to a specific wavelength of light. For example, in the eye-tracking module 100 depicted in FIG. 1, the sensing module 20 may further include two filter devices for adjusting the transmission characteristics of the left-eye image sensor 20L and the right-eye image sensor 20R with respect to specific wavelengths of light, respectively; in the eye-tracking module 200 depicted in FIG. 2, the sensing module 20 may further include three filter devices for adjusting the transmission characteristics of the left-eye image sensor 20L, the right-eye image sensor 20R and the scene image sensor 20C with respect to specific wavelength ranges of light, respectively.

In the eye-tracking module 100 or 200 of the present invention, the lighting device 30 includes light sources $IR_1 \sim IR_N$ and a light source driver 32, wherein N is a positive integer. The light sources $IR_1 \sim IR_N$ are configured to illuminate user eyes, and the light source driver 32 is configured to adjust the brightness of each light source according to a brightness control signal S4 provided by the processor 40, thereby adjusting the quality of the eye images captured by the image sensor. In an embodiment, the light sources $IR_1 \sim IR_N$ may be IR light sources disposed in the eye-tracking module 100 or 200 at locations capable of illuminating user eyes. However, the type, the amount and the locations of the light sources included in the eye-tracking module 100 or 200 do not limit the scope of the present invention.

In the present invention, the processor 40 is configured to control the operation of each device in the eye-tracking module 100 or 200. For example, the processor 40 may provide the power control signal S1 for adjusting the power supplied by the power module 10 to each device, provide the image control signal S3 for adjusting the sampling rate of each image sensor in the sensing module 20, and provide the brightness control signal S4 for adjusting the brightness of each light source in the lighting device 30, thereby switching the operational mode of the eye-tracking module 100 or 200 of the present invention. Meanwhile, the processor 40 is configured to provide the above-mentioned power control signal S1, the image control signal S3 or the brightness control signal S4 according to the data recorded by the sensing module 20 or the power status signal S2 provided by the power management module 10.

In the present invention, the processor 40 may receive and analyze the data recorded by the sensing module 20. In the eye-tracking module 100 depicted in FIG. 1 or in the eye-tracking module 200 depicted in FIG. 2, the processor 40 is configured to receive the eye images captured by the left-eye image sensor 20L and the right-eye image sensor 20R, calculate and then output ocular information which includes eye characteristics, eye movement and/or eye gaze coordinates of the user. In the eye-tracking module 200 depicted in FIG. 2, the processor 40 is further configured to determine whether an eye-tracking operation is currently running according to the data provided by at least one of the scene image sensor 20C, the audio sensor 22 and the proximity sensor 24. In the eye-tracking module 200 depicted in FIG. 2, the processor 40 is further configured to determine whether ambient light with sufficient intensity and uniform distribution exists in the environment of the user.

In the eye-tracking module 100 or 200 of the present invention, the processor 40 may be implemented as a system on chip (SoC), an application specific integrated circuit (ASCI) or a field programmable gate array (FPGA). In an embodiment, the processor 40 is configured to transmit the ocular information including eye characteristics, eye movement and/or eye gaze coordinates of the user to an HMD directly via a low-speed interface for reducing the loading of data transmission and subsequent computation. In another embodiment, the processor 40 is configured to transmit the ocular information including eye characteristics, eye movement and/or eye gaze coordinates of the user to an HMD via a low-speed interface and a low-power interface (such as a USB type C interface). In another embodiment, the processor 40 is configured to transmit the ocular information including eye characteristics, eye movement and/or eye gaze coordinates of the user to an HMD via a low-speed interface and a wireless communication interface (such as a Wifi interface or a Bluetooth interface). However, the method of transmitting data to an HMD installed with the present eye-tracking module does not limit the scope of the present invention.

In the present invention, the eye-tracking module 100 or 200 may operate in a normal mode and a power saving mode, wherein the power saving mode may be a simple mode, a sleep mode or a power-down mode. When operating in the normal mode, each device in the eye-tracking module 100 or 200 is configured to function with its optimized efficiency, and the processor 40 is configured to output the ocular information which includes full data of the eye characteristic of the user, the eye movement of the user, and the gaze coordinates of the user. When operating in the power-saving mode, at least one device in the eye-tracking module 100 or 200 is deactivated or configured to function with a reduced efficiency for energy conservation purpose.

When operating in the simple mode, each device in the eye-tracking module 100 or 200 is configured to function with its optimized efficiency, while the processor 40 is configured to determine whether the user has gazed at one or multiple user-preset regions and thus output the ocular information which includes partial data. Each user-preset region may be a specific range of coordinates in a virtual world, or a region centered at a specific mark in the real world. In the embodiment of the real world, the specific mark may be a light source, a specific image, or a specific characteristic of an object. In the embodiment that the specific mark is a light source in the real world, various user-preset regions may be distinguished by the color, wavelength, flicking frequency or brightness of the light source.

When operating in the sleep mode, only the processor 40 is configured to function with a low efficiency, while all other devices in the eye-tracking module 100 or 200 are deactivated. When operating in the power-down mode, all devices in the eye-tracking module 100 or 200 are deactivated. It is to be noted that the name or the definition of the power-saving mode may vary for different manufacturers or in different application fields. The above-mentioned name or implementation of the simple mode, the sleep mode or the power-down mode does not limit the scope of the present invention.

In the eye-tracking module 100 or 200 of the present invention, the memory unit 50 is configured to store the firmware settings associated with different operational modes of the eye-tracking module 100 or 200. For example, when the eye-tracking module 100 or 200 switches from the power-saving mode to the normal mode, the processor 40 may rapidly resume the firmware setting and the operation of the normal mode based on the data stored in the memory unit 50, thereby maintaining the accuracy of eye-tracking operations. In an embodiment, the memory unit 50 may be flash memory. However, the implementation of the memory unit 50 does not limit the scope of the present invention.

For illustrative purposes, various power supply statuses of the power management module 10 are defined as follows. When the amount or the stability of the power outputted by the power management module 10 is higher than a predetermined range, the power supply status is deemed good. When the amount or the stability of the power outputted by the power management module 10 is within the predetermined range, it indicates that the power management module 10 may soon fail to provide sufficient power or maintain output stability. When the amount or the stability of the power outputted by the power management module 10 is lower than the predetermined range, it indicates that the power management module 10 is unable to provide sufficient power or is encountering large-scale power fluctuation.

In an embodiment of the present invention, when the power status signal S2 provided by the power management module 10 indicates that the amount or the stability of its out power is within the predetermined range, the processor 40 may decrease the sampling rate of each image sensor in the sensing module 20 and the output frequency of the processor 40, thereby reducing power consumption. In another embodiment of the present invention, when the power status signal S2 provided by the power management module 10 indicates that the amount or the stability of its out power is lower than the predetermined range, the processor 40 may decrease the sampling rate of each image sensor in the sensing module 20, decrease the output frequency of the processor 40 and switch the eye-tracking module 100 or 200 from the normal mode to the power-saving mode, thereby further reducing power consumption.

In another embodiment of the present invention, the sensing module 20 includes a left-eye image sensor 20L and a right-eye image sensor 20R configured to respectively capture the left-eye images and the right-eye images of the user at respective sampling rates. The processor 40 is configured to adjust the sampling rates of the left-eye image sensor 20L and the right-eye image sensor 20R, adjust the output frequency of the processor 40, or switch the operational mode of the eye-tracking module 100 or 200 further according to the eye images recorded by the left-eye image sensor 20L and the right-eye image sensor 20R. For example, among a plurality of image frames recorded by the left-eye image sensor 20L and the right-eye image sensor 20R, the processor 40 is configured to determine whether more than a predetermined amount of consecutive frames among the plurality of frames do not include a predetermined object. The above-mentioned predetermined object may be an eye, a pupil or any facial feature of the user. When it is determined that the predetermined object is absent in more than the predetermined amount of consecutive frames among the plurality of frames, it indicates that the user is not wearing the HMD installed with the present eye-tracking module 100 or 200 or that the user has not made any eye movement for an extended period of time, thus requiring no eye-tracking operation. Under such circumstance, the processor 40 is configured to decrease the sampling rate of each image sensor in the sensing module 20, decrease the output frequency of the processor 40, and/or switch the eye-tracking module 100 or 200 from the normal mode to the sleep mode or to the power-down mode, thereby further reducing power consumption.

In another embodiment of the present invention, the sensing module 20 includes a left-eye image sensor 20L, a right-eye image sensor 20R and a scene image sensor 20C, wherein the left-eye image sensor 20L and the right-eye image sensor 20R are configured to respectively capture the left-eye images and the right-eye images of the user at respective sampling rates, and the scene image sensor 20C is configured to record a scene image within the visual perspective of the user. The processor 40 is configured to adjust the sampling rates of the left-eye image sensor 20L and the right-eye image sensor 20R, adjust the output frequency of the processor 40, or switch the operational mode of the eye-tracking module 100 or 200 further according to the eye images recorded by the left-eye image sensor 20L and the right-eye image sensor 20R, and yet further according to the scene image recorded by the scene image sensor 20C. For example, among a plurality of image frames recorded by the scene image sensor 20C, the processor 40 is configured to determine whether more than a predetermined amount of consecutive frames among the plurality of frames do not include a predetermined object. The above-mentioned predetermined object may be a specific light source or image associated with an eye-tracking operation. When it is determined that the predetermined object is absent in more than the predetermined amount of consecutive frames among the plurality of frames, it indicates that no eye-tracking operation is currently running. Under such circumstance, the processor 40 is configured to decrease the sampling rate of each image sensor in the sensing module 20, decrease the output frequency of the processor 40, and/or switch the eye-tracking module from the normal mode to the sleep mode or to the power-down mode, thereby further reducing power consumption.

In another embodiment of the present invention, the sensing module 20 includes a left-eye image sensor 20L, a right-eye image sensor 20R and a scene image sensor 20C, wherein the left-eye image sensor 20L and the right-eye image sensor 20R are configured to respectively capture the left-eye images and the right-eye images of the user at respective sampling rates, and the scene image sensor 20C is configured to record a scene image within the visual perspective of the user. The processor 40 is configured to adjust the sampling rates of the left-eye image sensor 20L and the right-eye image sensor 20R, adjust the output frequency of the processor 40, or switch the operational mode of the eye-tracking module 100 or 200 further according to the eye images recorded by the left-eye image sensor 20L and the right-eye image sensor 20R, and yet further according to the scene image recorded by the scene image sensor 20C. For example, the processor 40 is configured to determine whether any of the image frames recorded by the scene image sensor 20C includes a predetermined message from the user. The above-mentioned predetermined message may be a user gesture associated with an eye-tracking operation. When it is determined that the predetermined message is absent from the image frames recorded by the scene image sensor 20C, it indicates that no eye-tracking operation is currently running. Under such circumstance, the processor 40 is configured to decrease the sampling rate of each image sensor in the sensing module 20, decrease the output frequency of the processor 40, and/or switch the eye-tracking module from the normal mode to the sleep mode or to the power-down mode, thereby further reducing power consumption.

In another embodiment of the present invention, the sensing module 20 includes a left-eye image sensor 20L, a right-eye image sensor 20R and an audio sensor 22, wherein the left-eye image sensor 20L and the right-eye image sensor 20R are configured to respectively capture the left-eye images and the right-eye images of the user at respective sampling rates, and the audio sensor 22 is configured to record audio data associated with the acoustic information associated with the environment of the user. The processor 40 is configured to adjust the sampling rates of the left-eye image sensor 20L and the right-eye image sensor 20R, adjust the output frequency of the processor 40, or switch the operational mode of the eye-tracking module 100 or 200 further according to the eye images recorded by the left-eye image sensor 20L and the right-eye image sensor 20R, and yet further according to the audio data recorded by the audio sensor 22. The above-mentioned audio data may be the content, the intensity, the frequency and/or the duration of sound associated with an eye-tracking operation in the environment of the user. When it is determined that no eye-tracking operation is currently running according to the above-mentioned audio data, the processor 40 is configured to decrease the sampling rate of each image sensor in the sensing module 20, decrease the output frequency of the processor 40, and/or switch the eye-tracking module from the normal mode to the sleep mode or the power-down mode, thereby further reducing power consumption.

In another embodiment of the present invention, the sensing module 20 includes a left-eye image sensor 20L, a right-eye image sensor 20R and a proximity sensor 24, wherein the left-eye image sensor 20L and the right-eye image sensor 20R are configured to respectively capture the left-eye images and the right-eye images of the user at respective sampling rates, and the proximity sensor 24 is configured to record motion data associated with an eye-tracking operation in the environment of the user. The processor 40 is configured to adjust the sampling rates of the left-eye image sensor 20L and the right-eye image sensor 20R, adjust the output frequency of the processor 40, or switch the operational mode of the eye-tracking module 100 or 200 further according to the eye images recorded by the left-eye image sensor 20L and the right-eye image sensor 20R, and yet further according to the motion data recorded by the proximity detector 24. When it is determined that no eye-tracking operation is currently running according to the above-mentioned motion data, the processor 40 is configured to decrease the sampling rate of each image sensor in the sensing module 20, decrease the output frequency of the processor 40, and/or switch the eye-tracking module from the normal mode to the sleep mode or to the power-down mode, thereby further reducing power consumption.

In another embodiment of the present invention, the sensing module 20 includes a left-eye image sensor 20L and a right-eye image sensor 20R, while the lighting device includes a single IR light source $IR_1$ and a light source driver 32. The left-eye image sensor 20L and the right-eye image sensor 20R are configured to respectively capture the left-eye images and the right-eye images of the user at respective sampling rates. The IR light source $IR_1$ is arranged to illuminate an eye of the user. The light source driver 32 is configured to control the operation of the IR light source $IR_1$ according to the brightness control signal S4 provided by the processor 40, thereby adjusting the quality of the eye images recorded by the left-eye image sensor 20L and the right-eye image sensor 20R. When it is determined that the power supply status of the power management module 10 (such as the amount or the stability of its output power) is lower than the predetermined range, it indicates that the power management module is unable to provide sufficient power or is encountering large-scale power fluctuation. Under such circumstance, the processor 40 is configured to instruct the light source driver 32 to decrease the brightness of the IR light source $IR_1$ or deactivate the IR light source $IR_1$, thereby reducing power consumption. When it is determined that the quality of the eye images recorded by the left-eye image sensor 20L and the right-eye image sensor 20R is lower than a predetermined standard, the processor 40 is configured to instruct the light source driver 32 to increase the brightness of the IR light source $IR_1$, thereby improving image quality. When switching the eye-tracking module 100 or 200 from the normal mode to the sleep mode or to the power-down mode, the processor 40 is also configured to instruct the light source driver 32 to deactivate the IR light source $IR_1$.

In another embodiment of the present invention, the sensing module 20 includes a plurality of left-eye image sensors 20L and a plurality of right-eye image sensors 20R, while the lighting device includes a plurality of IR light sources $IR_1 \sim IR_N$ (N is an integer larger than 1) and a light source driver 32. The plurality of left-eye image sensors 20L and the right-eye image sensors 20R are configured to respectively capture the left-eye images and the right-eye images of the user at respective sampling rates. The IR light sources $IR_1 \sim IR_N$ are arranged to illuminate the eyes of the user. The light source driver 32 is configured to control the operation of the IR light sources $IR_1 \sim IR_N$ according to the brightness control signal S4 provided by the processor 40, thereby adjusting the quality of the eye images recorded by the left-eye image sensors 20L and the right-eye image sensors 20R. According to the power supply status of the power management module 10 (such as the amount or the stability of its output power), the quality of the eye images recorded by the image sensors in the sensing module 20, and/or the operational status of the eye-tracking module 100 or 200 (whether the eye-tracking module 100 or 200 is executing a calibration/re-calibration operation), the processor 40 is further configured to selectively activate or deactivate a specific number of light sources or the light sources disposed on specific locations in the lighting device 30, or selectively activate or deactivate a specific number of image sensors or the image sensors disposed on specific locations in the sensing module 20, thereby outputting the ocular information which includes eye characteristics, eye movement and/or eye gaze coordinates of the user based on the image data recorded by the activated image sensors. For example, when it is determined that the power supply status of the power management module 10 (such as the amount or the stability of its output power) is lower than the predetermined range, the processor 40 is configured to instruct the light source driver 32 to decrease the brightness of the lighting device 30 or deactivate more image sensors in the sensing module 20 for reducing power consumption. When it is determined that the quality of the eye images recorded by the left-eye image sensors 20L and the right-eye image sensors 20R is lower than the predetermined standard, the processor 40 is configured to instruct the light source driver 32 to activate more light sources in the lighting device 30 or activate more image sensors in the sensing module 20 for improving image quality. When the eye-tracking module 100 or 200 is currently executing the calibration/re-calibration operation, the processor 40 is configured to instruct the light source driver 32 to activate more light sources in the lighting device 30 or activate more image sensors in the sensing module 20 for improving the accuracy of the calibration/re-calibration operation.

In an embodiment, the maximum tolerance on the accuracy of eye-tracking operation may be defined for each application field of the eye-tracking module 100 or 200, and the estimated accuracy of eye-tracking operation may be defined for each luminance level of the lighting device 30 or the number of activated image sensors in the sensing module 02. The processor 40 is configured to determine whether a first condition, a second condition and a third condition are satisfied. The first condition is satisfied when the power supply status of the power management module 10 (such as the amount or the stability of its output power) is lower than a predetermined range. The second condition is satisfied when the quality of the eye images captured by the left-eye image sensors 20L and the right-eye image sensors 20R is lower than a predetermined standard. The third condition is satisfied when the eye-tracking module 100 or 200 is currently executing the calibration operation or the re-calibration operation. When at least two among the first to third conditions are satisfied, the processor 40 is configured to determine the priority of energy conservation and the priority of eye-tracking accuracy based on the maximum tolerance on the accuracy and the estimated accuracy of eye-tracking operation for the current application field of the eye-tracking module 100 or 200. When the estimated accuracy is smaller than the maximum tolerance on the accuracy of eye-tracking operation for the current application field, the priority of energy conservation is higher than the priority of eye-tracking accuracy. Under such circumstance, the processor 40 is configured to deactivate more light sources or images sensors when determining that at least two among the first to third conditions are satisfied. When the maximum tolerance on the accuracy of eye-tracking operation is smaller than the estimated accuracy for the current application field, the priority of eye-tracking accuracy is higher than the priority of energy conservation. Under such circumstance, the processor 40 is configured to activate more light sources or images sensors when determining that at least two among the first to third conditions are satisfied.

In another embodiment, the priority of energy conservation and the priority of eye-tracking accuracy may be set by the user. If the priority of energy conservation is higher than the priority of eye-tracking accuracy according to user setting, the processor 40 is configured to deactivate more light sources or images sensors when determining that at least two among the first to third conditions are satisfied. If the priority of eye-tracking accuracy is higher than the priority of energy conservation according to user setting, the processor 40 is configured to activate more light sources or images sensors when determining that at least two among the first to third conditions are satisfied.

In another embodiment of the present invention, the sensing module 20 includes one or multiple left-eye image sensors 20L and one or multiple right-eye image sensors 20R, while the lighting device includes one or multiple left-eye IR light sources, one or multiple right-eye IR light sources and a light source driver 32. At least one left-eye IR light source and at least one left-eye image sensor 20L may be disposed in the vicinity of the left eye of the user for illuminating the left eye and capturing left-eye images. At least one right-eye IR light source and at least one right-eye image sensor 20L may be disposed in the vicinity of the right eye of the user for illuminating the right eye and capturing right-eye images. The processor 40 is configured to provide the image control signal S3 and the brightness control signal S4 according to the quality of the left-eye and right-eye images, thereby controlling the left-eye/right-eye IR light sources and left-eye/right-eye IR image sensors. In the embodiment when the priority of energy conservation is higher, when it is determined that the quality of the left-eye images is lower than the quality of the right-eye images, the processor 40 is configured to instruct the light source driver 32 to deactivate more left-eye light sources in the lighting device 30, instruct the light source driver 32 to decrease the brightness of the activated left-eye light sources in the lighting device 30, or instruct the sensing module 20 to deactivate more left-eye image sensors for reducing power consumption. In the embodiment when the priority of eye-tracking accuracy is higher, when it is determined that the quality of the left-eye images is lower than the quality of the right-eye images, the processor 40 is configured to instruct the light source driver 32 to activate more left-eye light sources in the lighting device 30, instruct the light source driver 32 to increase the brightness of the activated left-eye light sources in the lighting device 30, or instruct the sensing module 20 to activate more left-eye image sensors for improving the quality of the left-eye images.

In another embodiment of the present invention, the sensing module 20 includes a left-eye image sensor 20L, a right-eye image sensor 20R, and an ambient light sensor 26, while the lighting device 30 includes one or multiple IR light sources $IR_1 \sim IR_N$ (N is an integer larger than 1) and a light source driver 32. The left-eye image sensor 20L and the right-eye image sensor 20R are configured to respectively capture the left-eye images and the right-eye images of the user at respective sampling rates. The IR light source $IR_1 \sim IR_N$ are arranged to illuminate the eyes of the user. The light source driver 32 is configured to control the operation of the IR light sources $IR_1 \sim IR_N$ according to the brightness control signal S4 provided by the processor 40, thereby adjusting the quality of the eye images recorded by the left-eye image sensor 20L and the right-eye image sensor 20R. The processor 40 is configured to provide the brightness control signal S4 according to the ambient light data recorded by the ambient light sensor 26, thereby controlling the operation of the IR light source $IR_1 \sim IR_N$. The above-mentioned ambient light may come from sunlight or a fluorescent lamp. When it is determined that the ambient light has high intensity or uniform distribution, the processor 40 is configured to instruct the light source driver 32 to deactivate a specific number of light sources or the light sources disposed on specific locations in the lighting device 30 for reducing power consumption. When it is determined that the ambient light has low intensity or non-uniform distribution, the processor 40 is configured to instruct the light source driver 32 to increase the brightness of the lighting device 30 for improving image quality.

As previously states, the sensing module 20 may further include at least one filter device for adjusting the transmission characteristic of the at least one image sensor with respect to a specific wavelength range of light. In an embodiment, the filter device may only transmit IR light and be disposed in front of the at least one image sensor, thereby capable of reducing the non-IR incident component of the image sensor and thus improving its image quality. In another embodiment, when the eye-tracking module 100 or 200 is installed on an AR device, a smart glass or any glass-type device with a lens, the filter device may only block IR light and be disposed on one side of the lens which does not face the user, thereby capable of reducing environmental IR interferences and thus improving the image quality of the image sensor.

Figure 3:
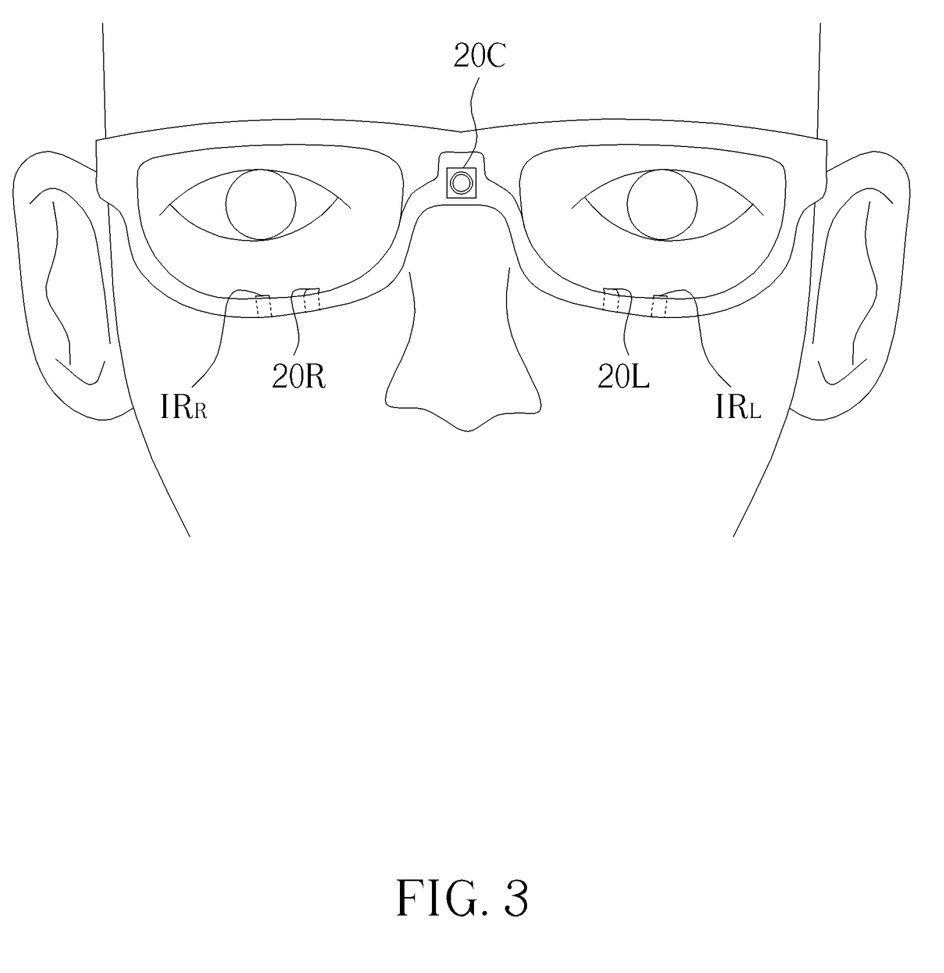
FIG. 3 is a front-view diagram illustrating an embodiment of an eye-tracking module according to an embodiment of the present invention.
Figure 4:
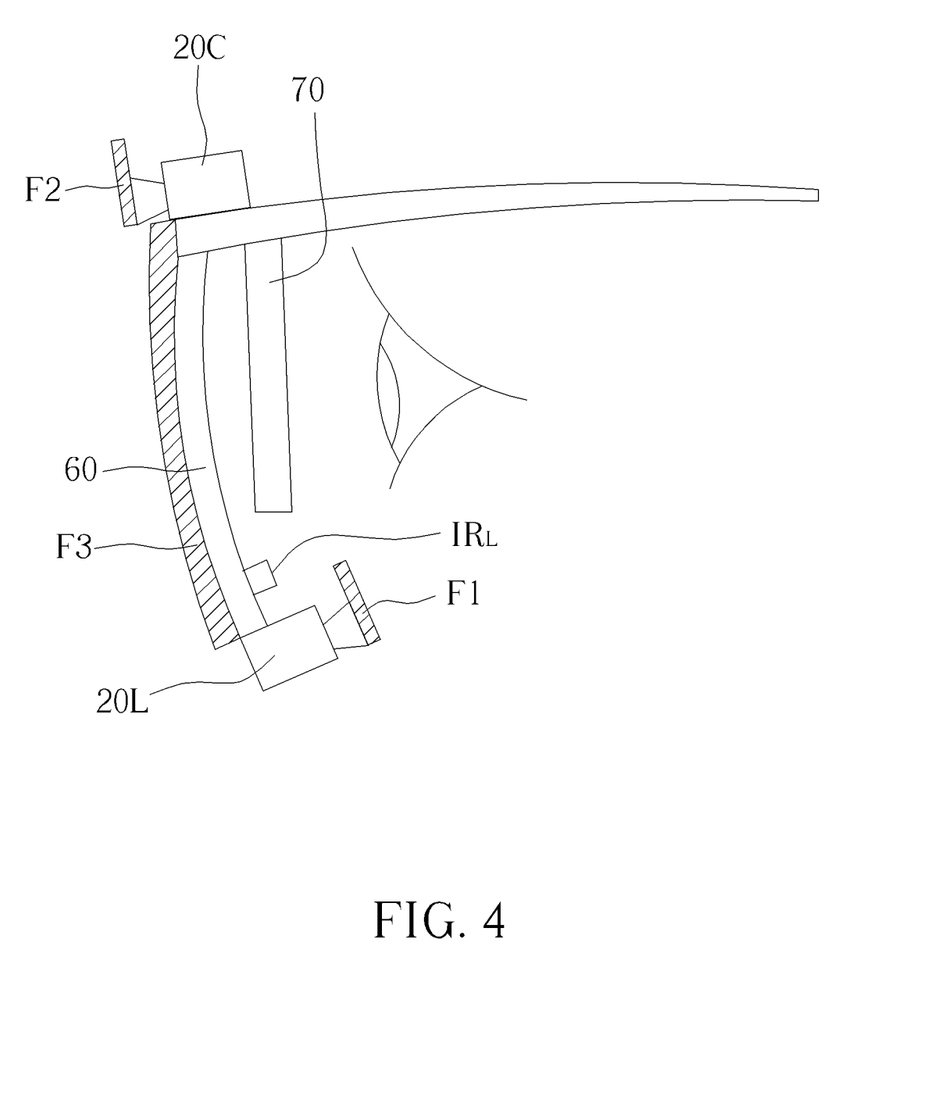
FIG. 4 is a side-view diagram illustrating an embodiment of an eye-tracking module according to an embodiment of the present invention.

FIG. 3 is a front-view diagram illustrating an embodiment of the eye-tracking module 100 or 200 according to an embodiment of the present invention. FIG. 4 is a side-view diagram illustrating an embodiment of the eye-tracking module 100 or 200 according to an embodiment of the present invention. For illustrative purpose, it is assumed that the eye-tracking module 100 or 200 is installed on an AR device, a smart glass or any glass-type device with a lens. FIGS. 3 and 4 only depict the left-eye image sensor 20L, the right-eye image sensor 20R, the scene image sensor 20C, and filter devices F1~F3 in the sensing module 20, as well as a left-eye light source $IR_L$ and a right-eye light source $IR_R$ in the lighting device 30. In the eye-tracking module 100 or 200, the power management module 10, the light source driver 32 of the lighting device 30, the processor 40 and the memory device 50 may be disposed at any suitable location, and thus are not shown in FIGS. 3 and 4.

In the embodiment illustrated in FIGS. 3 and 4, the filter devices F1 may only transmit IR light and be disposed in front of the left-eye image sensor 20L and the right-eye image sensor 20R on the side that faces the user. The filter device F2 may only transmit non-IR light and be disposed in front of the scene image sensor 20C on the side that does not face the user. The filter device F3 may be disposed in front of the lens on the side that does not face the user. In an embodiment, each of the filter devices F1~F3 may be an optical band-pass filter, optical coating, or made of materials with different optical transmission to different wavelengths. However, the locations and types of the filter devices F1~F3 do not limit the scope of the present invention.

In another embodiment, each of the filter devices F1~F3 may be an electrically-controlled filter device. The processor 40 may adjust the optical transmission of each filter device according to the image data recorded by the left-eye image sensor 20L and the right-eye image sensor 20R, the power status signal S2 provided by the power management module 10, and/or the ambient light status detected by the ambient light sensor 26. For example, when the power status signal S2 provided by the power management module 10 indicates that the amount or the stability of its output power is lower than the predetermined range, the processor 40 is configured to lower the brightness of the lighting device 30 for reducing power consumption and adjust the optical transmission of the filter device F1~F3 for maintaining the image quality of the left-eye image sensor 20L and the right-eye image sensor 20R.

In conclusion, the present invention provides an eye-tracking module with scenario-based mode switching function. According to the power status of the power management module, the eye image captured by the image sensor, the scene image recorded by the scene image sensor, the audio data associated with the environment of the user recorded by the audio sensor, and/or the motion data associated with the environment of the user recorded by the proximity sensor, the present eye-tracking module can adjust the sampling rate of each image sensor in the sensing module, the output frequency of the processor and its operational mode, thereby reducing power consumption or improving the accuracy of eye-tracking operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An eye-tracking module, comprising:
    a power management module configured to supply a power according to a power control signal for operating the eye-tracking module in a corresponding mode, and provide a power status signal associated with a power supply status of the power management module;
    a sensing module comprising:
        at least one image sensor configured to capture an eye image of a user at a sampling rate; and
        a scene image sensor for recording a scene image within a visual perspective of the user, wherein the scene image includes a plurality of frames; and
    a processor configured to:
        acquire an ocular information which includes at least one of an eye characteristic of the user, an eye movement of the user, and a gaze coordinate of the user according to the eye image;
        adjust at least one of the sampling rate, an output frequency of the processor and an operational mode of the eye-tracking module according to the power status signal and the scene image;
        determine whether more than a predetermined amount of consecutive frames among the plurality of frames of the scene image do not include a first predetermined object associated with an eye-tracking operation; and
        decrease the sampling rate, decrease the output frequency of the processor, and/or switch the eye-tracking module from a normal mode to a power-saving mode when it is determined that more than the predetermined amount of consecutive frames among the plurality of frames do not include the first predetermined object, wherein the eye-tracking module consumes less power when operating in the power-saving mode than in the normal mode.

2. The eye-tracking module according to claim 1, wherein:
    the processor is further configured to decrease the sampling rate or the output frequency of the processor when it is determined according to the power status signal that an amount or a stability of the power supplied by the power management unit is within a predetermined range; and
    the processor is further configured to decrease the sampling rate, decrease the output frequency of the processor and switch the eye-tracking module from a normal mode to a power-saving mode when it is determined according to the power status signal that the amount or the stability of the power supplied by the power management unit is lower than the predetermined range.

3. The eye-tracking module according to claim 1, wherein:

the eye image includes a plurality of frames; and
the processor is further configured to:
 determine whether more than a predetermined amount of consecutive frames among the plurality of frames of the eye image do not include a second predetermined object associated with a facial feature of the user; and
 decrease the sampling rate, decrease the output frequency of the processor, and/or switch the eye-tracking module from the normal mode to the power-saving mode when it is determined that more than the predetermined amount of consecutive frames among the plurality of frames do not include the second predetermined object.

4. The eye-tracking module according to claim 1, further comprising:
 a first filter device disposed on a side of the at least one image sensor and configured to transmit light whose wavelength is within a first predetermined range, wherein the side of the at least one image sensor faces the user.

5. The eye-tracking module according to claim 4, wherein:
 the first filter is an electrically-controlled filter devices; and
 the processor is further configured to adjust an optical transmittance of the first filter according to a quality of the eye image.

6. The eye-tracking module according to claim 4, further installed on a head-mounted device with a lens, and further includes:
 a second filter device disposed in front of the lens and configured to transmit light whose wavelength is within a second predetermined range, wherein the first predetermined range and the second predetermined range are not overlapped.

7. The eye-tracking module according to claim 6, wherein:
 the second filter is an electrically-controlled filter devices; and
 the processor is further configured to adjust an optical transmittance of the second filter according to a quality of the eye image.

8. The eye-tracking module according to claim 1, wherein:
 the sensing module further includes an audio sensor for recording an audio data associated with an environment of the user; and
 the processor is further configured to adjust at least one among the sampling rate, the output frequency of the processor and the operational mode of the eye-tracking module according to the audio data.

9. The eye-tracking module according to claim 8, wherein the processor is further configured to:
 determine whether the eye-tracking operation is currently running according to the audio data; and
 decrease the sampling rate, decrease the output frequency of the processor, and/or switch the eye-tracking module from the normal mode to the power-saving mode when it is determined that no eye-tracking operation is currently running according to the audio data.

10. The eye-tracking module according to claim 1, wherein:
 the sensing module further includes a proximity sensor for recording a motion data associated with the eye-tracking operation in an environment of the user; and
 the processor is further configured to adjust at least one among the sampling rate, the output frequency of the processor and the operational mode of the eye-tracking module according to the motion data.

11. The eye-tracking module according to claim 10, wherein the processor is further configured to:
 determine whether the eye-tracking operation is currently running according to the motion data; and
 decrease the sampling rate, decrease the output frequency of the processor, and/or switch the eye-tracking module from the normal mode to the power-saving mode when it is determined that no eye-tracking operation is currently running according to the motion data.

12. The eye-tracking module according to claim 1, further comprising a lighting device which includes:
 at least one light source for illuminating at least one eye of the user; and
 a light source driver configured to adjust a brightness of the at least one light source according to a brightness control signal provided by the processor.

13. The eye-tracking module according to claim 12, wherein the processor is further configured to provide the brightness control signal for instructing the light source driver to decrease the brightness of the at least one light source or to deactivate the at least one light source when it is determined according to the power status signal that an amount or a stability of the power supplied by the power management unit is lower than a predetermined range.

14. The eye-tracking module according to claim 12, wherein the processor is further configured to provide the brightness control signal for instructing the light source driver to adjust the brightness of the at least one light source according to a quality of the eye image.

15. The eye-tracking module according to claim 12, wherein:
 the processor is further configured to provide the brightness control signal for instructing the light source driver to decrease the brightness of the at least one light source or to deactivate the at least one light source when the eye-tracking module switches from the normal mode to the power-saving mode.

16. The eye-tracking module according to claim 1, further comprising a lighting device which includes:
 a plurality of light sources disposed at various locations for illuminating eyes of the user; and
 a light source driver configured to adjust a brightness of each light source according to a brightness control signal, wherein:
  the sensing module include a plurality of image sensors; and
  the processor is further configured to selectively activate or deactivate one or multiple light sources among the plurality of light sources which are disposed on one or multiple first predetermined locations, or selectively activate or deactivate one or multiple image sensors among the plurality of image sensors which are disposed on one or multiple second predetermined locations according to the power status signal or a quality of the eye image.

17. The eye-tracking module according to claim 16, wherein the processor is further configured to:
 determine a priority of energy conservation and a priority of eye-tracking accuracy for a current application field of the eye-tracking module;

determine whether an amount or a stability of the power supplied by the power management module is lower than a predetermined range according to the power status signal;

determine whether a quality of the eye image is lower than a predetermined standard;

determine that a first condition is satisfied when the amount or the stability of the power supplied by the power management module is lower than the predetermined range;

determine that a second condition is satisfied when the quality of the eye image is lower than the predetermined standard;

determine that a third condition is satisfied when the eye-tracking module is currently executing the calibration operation or the re-calibration operation;

deactivate the one or multiple light sources disposed on the one or multiple first predetermined locations for reducing the brightness of the lighting device or deactivate the one or multiple image sensors disposed on the one or multiple second predetermined locations for reducing an amount of activated image sensors when it is determined that at least two among the first to third conditions are satisfied and that the priority of energy conservation is higher than the priority of eye-tracking accuracy for the current application field of the eye-tracking module; and activate the one or multiple light sources disposed on the one or multiple first predetermined locations for increasing the brightness of the lighting device or activate the one or multiple image sensors disposed on the one or multiple second predetermined locations for increasing the amount of activated image sensors when it is determined that at least two among the first to third conditions are satisfied and that the priority of eye-tracking accuracy is higher than the priority of energy conservation for the current application field of the eye-tracking module.

18. The eye-tracking module according to claim 16, wherein:

the sensing module further comprises an ambient light sensor for detecting an ambient light status associated with an environment of the user; and the processor is further configured to:

deactivate the one or multiple light sources disposed on the one or multiple first predetermined locations for decreasing the brightness of the lighting device when it is determined according to the ambient light status that an ambient light with a sufficient intensity and a uniform distribution exists in the environment of the user; and activate the one or multiple light sources disposed on the one or multiple first predetermined locations for increasing the brightness of the lighting device when it is determined according to the ambient light status that the ambient light with the sufficient intensity and the uniform distribution does not exist in the environment of the user.

19. The eye-tracking module according to claim 16, wherein:

the sensing module comprises:

a left-eye image sensor configured to capture a left-eye image of the user at a left-eye sampling rate; and a right-eye image sensor configured to capture a right-eye image of the user at a right-eye sampling rate;

the lighting device comprises:

a left-eye light source for illuminating a left eye of the user;

a right-eye light source for illuminating a right eye of the user; and a light source driver configured to adjust a brightness of the left-eye light source and a brightness of the right-eye light source according to a brightness control signal; and the processor is further configured to:

receive the left-eye image and the right-eye image;

determine a quality of the left-eye image and a quality of the right-eye image;

selectively adjust the operations of the left-eye image sensor and the left-eye light source according to the quality of the left-eye image; and electively adjust the operations of the right-eye image sensor and the right-eye light source according to the quality of the right-eye image.

20. The eye-tracking module according to claim 1, wherein the first predetermined object associated with the eye-tracking operation is a specific light source or an image associated with the eye tracking operation.

* * * * *